United States Patent [19]
Bradley

[11] 3,773,164
[45] Nov. 20, 1973

[54] APPARATUS FOR SWINGING A TUBULAR CONVEYOR SECTION

[75] Inventor: Richard S. Bradley, Fairmont, Minn.

[73] Assignee: Art's-Way Manufacturing Company Incorporated, Armstrong, Iowa

[22] Filed: Dec. 16, 1971

[21] Appl. No.: 208,658

[52] U.S. Cl. .................................. 198/64, 198/213
[51] Int. Cl. ............................................. B65g 47/16
[58] Field of Search ............................ 198/64, 213; 214/83.32

[56] References Cited
UNITED STATES PATENTS

| | | | |
|---|---|---|---|
| 3,179,272 | 4/1965 | Goldberger | 214/83.32 |
| 2,541,742 | 2/1951 | Booth | 198/64 |
| 3,021,025 | 2/1962 | Sudenga et al. | 198/64 |
| 3,638,812 | 2/1972 | Ryczek | 214/83.32 |
| 2,601,608 | 6/1952 | Hansen | 214/83.32 |
| 3,133,727 | 5/1964 | Luscombe | 198/213 X |

Primary Examiner—Richard E. Aegerter
Assistant Examiner—Joseph E. Valenza
Attorney—George F. Williamson et al.

[57] ABSTRACT

A mechanical apparatus for swinging a first section of a tubular conveyor relative to a second section, the apparatus having an integral frame rigidly attached to the second conveyor section and including a cylindrical worm wheel mount and adjacent worm wheel cradle. A worm wheel rotatably mounted on the worm wheel mount and rigidly attached to a first conveyor section meshes with a worm gear rotatably mounted in the cradle in order to rotate the worm wheel in response to rotation of the worm gear by an operator, thereby swinging the first conveyor section relative to the second section.

4 Claims, 3 Drawing Figures

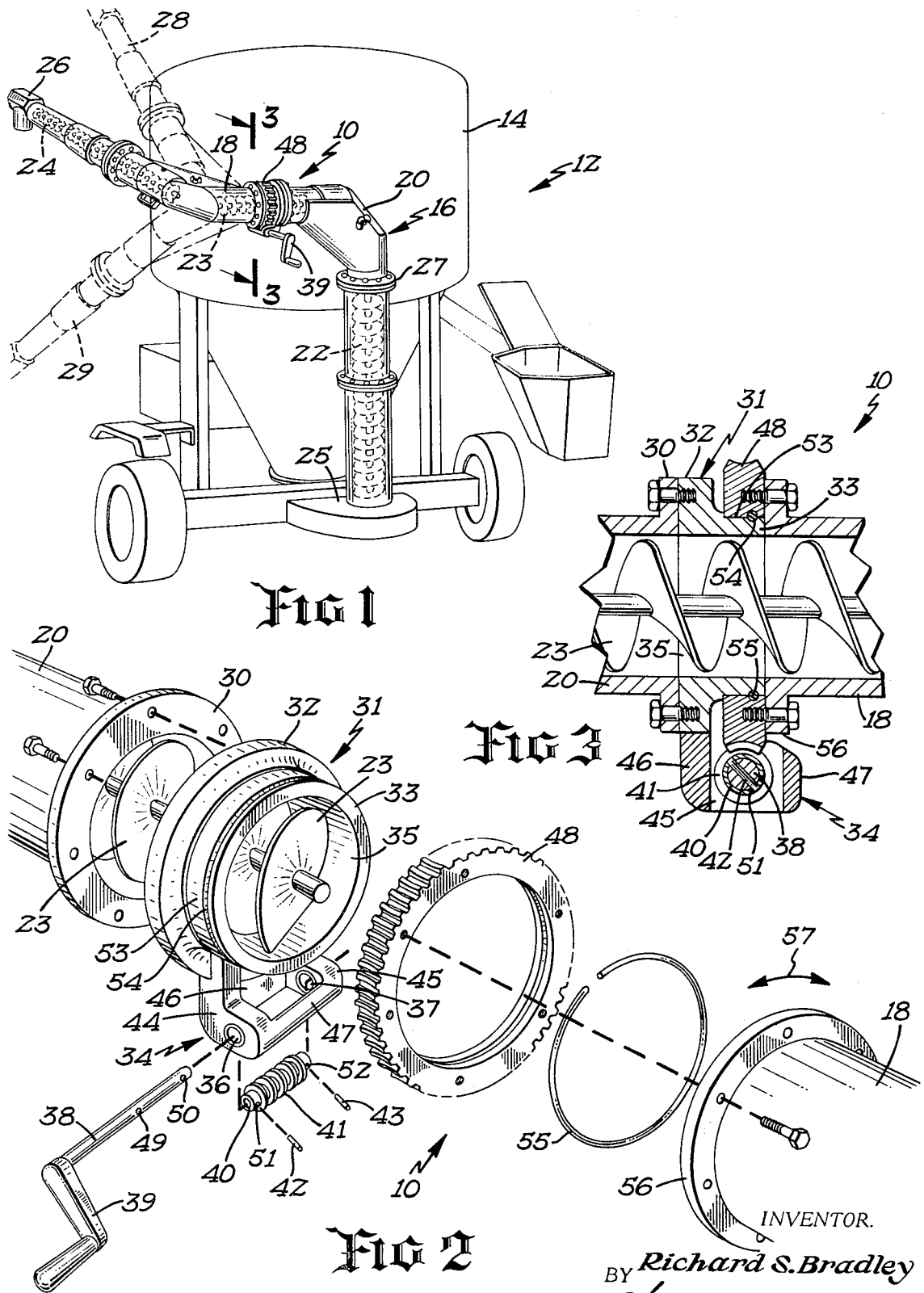

APPARATUS FOR SWINGING A TUBULAR CONVEYOR SECTION

BACKGROUND OF THE INVENTION

Many farm implements utilize tubular conveyors containing rotating augers in order to transfer grain, silage, livestock feeds, or the like from the implement to a second location. These tubular conveyers frequently have several movable sections permitting the conveyor to be rotated about a vertical axis to aim the conveyor in a desirable compass direction. Ordinarily the conveyor is also rotatable about a horizontal axis so the discharge end of the conveyor may be raised or lowered to reach the discharge location. Since rotation of the sections about the vertical axis does not involve lifting or lowering the conveyor, little effort is needed to so move the conveyor. However, the raising or lowering of the discharge end of the conveyor when the conveyor is loaded can require very considerable effort and usually requires a mechanical apparatus.

Typically the raising and lowering is accomplished with a worm gear and cooperating worm wheel actuated manually by an operator. A worm wheel is rigidly attached to an elbow section of the conveyor, the rotation of the wheel and elbow serving to raise or lower the discharge end of the conveyor; a worm gear meshed with the worm wheel and rotatably mounted in a mounting bracket secured to a second section of the conveyor which is stationary relative to the turning elbow, rotates the worm wheel in response to worm gear rotation to raise or lower the discharge end of the conveyor.

The described means for raising and lowering operates satisfactorily so long as no load is present in the conveyor sections. However, when the conveyor sections are fully loaded, the weight distribution greatly increases the effort required to turn the worm gear, making it exceedingly difficult to raise the extended conveyor sections without damage to the gear or worm wheel. A commonly recurring problem is that the teeth of worm wheel and gear disengage from one another or break under the loading resulting from a large weight of grain and the applied force of rotation. At times the mounting bracket retaining the worm gear may be forced away from the worm wheel by the resulting forces, rendering the apparatus inoperative. If the farm implement is towed over a bumpy field or road the strains on the teeth are further increased by accelerations generated by the bumpy road or field conditions. It is an object of the present invention to provide an apparatus which prevents the teeth of worm gear and worm wheel from separating despite the rough usage encountered in typical farming operationa.

SUMMARY OF THE INVENTION

The invention relates to the field of tubular conveyors for agricultural implements, but it should be understood that the invention is usable with tubular conveyors generally and need not be confined to the field of agricultural implements.

The invention comprises an apparatus for swinging a tubular conveyor section relative to a second section, and is particular useful for manipulating the loading or discharge tubular conveyors associated with farm implements. It is an object of the present invention to provide a reliable, long lasting, inexpensive structure which can handle the heavy strain between sections of a loaded tubular conveyor when the conveyor is raised while heavily loaded with grain or like material.

The invention is provided with an integral frame which is rigidly attached to a section of the tubular conveyor, the frame being provided with a cylindrical worm wheel mount extending from the frame coaxially with the conveyor section. The frame also has a worm gear cradle for rotatably mounting a worm gear, the cradle being an integral part of the frame and closely spaced to the cylindrical worm wheel mount.

A worm gear rotatably mounted in the cradle, meshes with the worm wheel which is mounted on the closely spaced cylindrical mount and cooperates with the worm wheel to swing a conveyor section rigidly attached to the worm wheel, in response to worm gear rotation. The integral frame of the invention insures that the worm gear and worm wheel are retained in meshing relationship under even the heaviest strains encountered with such tubular conveyors thereby eliminating the breakdown problems associated with prior art devices.

BRIEF DESCRIPTION OF THE DRAWINGS

FIG. 1 is a rear perspective view of a farm feed mixer provided with a tubular conveyor on which the invention is mounted.

FIG. 2 is an exploded perspective view of a portion of the tubular conveyor of FIG. 1.

FIG. 3 is a sectional view of the invention taken through cutting plane 3—3 of FIG. 1.

DESCRIPTION AND OPERATION OF THE INVENTION

Referring now to FIG. 1, an agricultural feed mixer 12 with a mixing bin 14 and tubular discharge conveyor 16 is provided with first and second conveyor sections 18 and 20, respectively, between which the invention 10 is mounted. The sections 18 and 20, here shown as elbows, may alternatively be straight or have other configuration without affecting the operation of the invention. A plurality of rotating augers 22, 23, and 24 rotatably coupled by bevel gears extend along and through the tubular conveyor 16 to carry material from the base 25 of the conveyor to the discharge end 26. Although a discharge conveyor is shown, the invention is equally usable with a loading or transfer conveyor.

Typically conveyor section 20 is rotatable about a vertical axis passing through mounting 27 to direct the conveyor in a desired direction from the mixer 12. In addition elbow section 18 is also rotatably mounted relative to elbow 20 in order to raise and lower the end 26 of the conveyor to various upper and lower positions such as 28 and 29 for communication with a grain trough, storage bin, or the like.

Referring now to FIGS. 2 and 3 conveyor section 20, with bored mounting flange 30 is rigidly attached by any appropriate means such as screws, bolts, welding, or the like to an integral frame 31 which includes a bored and threaded mounting flange 32, a cylindrical worm wheel mount 33 and an integral worm gear cradle 34 extending outward from the flange 32 which is shaped to accommodate its attachment to the section 20. The mount 33 extends axially from the annular flange 32 and the central axis of the cylindrical mount 33 is coaxial with the axis of the conveyor sections 18 and 20 permitting a rotating auger 23 to pass cleanly through the coaxial passage 35 through the frame 31.

The cradle 34 has bearing apertures 36 and 37 in which shaft 38, extending from handle 39, is mounted, the shaft 38 passing axially through central passage 40 of worm gear 41. The common axis of the apertures is oriented transverse to the axis of the mount 33. Pins 42 and 43, which pass through worm gear 41 and shaft 38 retain the worm gear 41 on the shaft and also retain the shaft 38 in operative position in bearing apertures 36 and 37. To assemble the shaft and worm gear, the gear 41 is oriented in the cradle with the passage 40 aligned with bearing apertures 36 and 37 and then the shaft is inserted therethrough and pins 42 and 43 are passed through gear 41 and shaft 38. The shaft 38, pins 42 and 43 and bores 49, 50, 51 and 52 serve as means for retaining the worm gear in the cradle 34. The handle 39 provides a reliable apparatus for rotating the worm gear. It should be understood that the handle could be easily replaced by motor driven apparatus for rotating the worm gear and such power apparatus is within the purview of the invention. As will be recognized by those skilled in the art, other apparatus can be used to retain the worm gear in position and is of course, within the purview of the invention.

The cradle 34 is formed of rigid material selected to be highly resistent to the bending and extraneous forces likely to be encountered. Typically the integral frame 31 is formed by casting. The worm gear cradle 34 is solidly constructed and closely spaced relative to mount 33; ears 44 and 45, in which bearing apertures 36 and 37 are formed are rigidly reinforced by members 46 and 47 extending between the ears to thereby form a substantially rigid rectangular cross section enclosure surrounding the worm gear on four sides. The gear 41 is selected from among commercially available gears and when in place in cradle 34 meshes with and cooperates with worm wheel 48, now to be described.

A worm wheel 48, selected from among commercially available units, is slidably mounted on the cylindrical worm wheel mount 33 adjacent flange 32 and meshed with the worm gear 41 causing the worm wheel to rotate in response to rotation of the worm gear 41. An annular slot 54 is located on the surface 53 of the cylindrical mount 33 to receive a snap ring 55, the slot and ring comprising means for retaining the worm wheel 48 adjacent flange 32 and on the surface 53 of cylindrical mount 33 during operation. Naturally other retaining means known to the art can be substituted for the shown apparatus and such alternatives are with the purview of the invention. Bored mounting flange 56 of conveyor section 18 can then be rigidly attached to the worm wheel 48 by any known means such as the shown bolts which pass through bores in flange 56 and thread into the worm wheel 48.

In operation, when it is desired to raise or lower the end 26 of the tubular conveyor 16, an operator rotates handle 39; alternatively, motor means may be provided to accomplish such rotation if desired. Rotation of the handle 39 causes worm gear 41 to rotate therewith since pins 42 and 43 substantially retain the gear relative to the shaft 38. As the worm gear 41 rotates within the confines of the cradle enclosure 34 its meshing relationship with worm wheel 48 causes the worm wheel to rotate at a slower rate but with a notably increased mechanical advantage. The movement of worm wheel 48 produces rotation of conveyor elbow section 18 relative to section 20 in the directions of arrow 57 causing the elbow 18 to gradually swing upward or downward carrying the end 26 of the conveyor upward or downward along with it. The integral one piece construction of the frame 31 and its solidly reinforced cradle enclosure 34 insure continued engagement between worm wheel 38 and worm gear 41 even when the heaviest loads are present in the conveyor and when the farm implement travels over rough surfaces. Since the worm wheel mount 33 and wheel 48 have axial passages therethrough, loading conveyor 23 can pass therethrough and rotate freely to carry material through the frame 31.

As will be clear to those skilled in the art, the invention 10 may be used with any type of tubular conveyor, and is not limited to a conveyor of the type shown or limited to the particular farm implement shown. It also has application in any conveying occupation where a rotating auger or the like must pass through and operate within the confines of a tubular conveyor.

While the preferred embodiments of the present invention have been described, it should be understood that various changes, adaptations and modifications may be made therein without departing from the spirit of the invention and the scope of the appended claims.

What is claimed is:

1. A conveyor apparatus for transfering animal feed between a bin and a delivery location comprising:

first and second tubular conveyor sections, said conveyor sections having central axes oriented horizontally, said second conveyor section having one end thereof communicating with the bin and the remaining end of said second section having a concentric, outwardly extending, annular flange encircling said second section and including a flat coupling surface oriented perpendicular to the axis of said second section and extending radially outward from said second section;

a tubular conveyor end section affixed to one end of said first section and extending outwardly therefrom in angled relationship to the axis of said first section so as to be raised and lowered as said first section rotates about its axis thereby permitting the free end of said end section to be swung to the delivery location;

an integral rigid frame positioned between said first and second sections, said frame including a cylindrical worm wheel bearing surface about a first end of said frame with an inner circular cross-section passage through said frame coaxial with said worm wheel bearing surface, said frame further including a circular cross-section annular flange extending radially outward relative to said worm wheel bearing surface and concentric therewith, said flange having a flat coupling surface oriented perpendicularly to the axis of said worm wheel bearing surface, said inner circular passage extending through and terminating at said coupling surface, said coupling surfaces of said second tubular conveyor section and of said flange being fixed to and stationary relative to one another and coaxial to permit transfer of animal feed between said second tubular section and said inner passage of said frame;

a worm wheel mounted concentrically on said worm wheel bearing surface for rotation relative thereto, said worm wheel having teeth directed radially outwardly and said worm wheel having a generally flat lateral coupling surface oriented perpendicular to the axis of said wheel and facing away from said flange of said frame;

means rotatably retaining said worm wheel on said worm wheel bearing surface of said frame;

said first tubular conveyor section having a concentric annular flange at its free end including a flat coupling surface oriented perpendicular to the axis of said first section and extending radially outward from said first section, said flat coupling surface of said first section affixed to said coupling surface of said worm wheel and coaxial therewith, the inner passage of said frame communicating with the interior of said first section to permit transfer of material between said inner passage and said first section, said first section rotating in response to rotation of said worm wheel;

said frame further including a rigid worm gear cradle extending outwardly from said flange of said frame, said cradle including a pair of ears adjacent and confronting the teeth of said worm wheel;

a worm gear rotatably mounted between said ears of said worm gear cradle in meshing engagement with said worm wheel;

means retaining said worm gear in said cradle; and apparatus for rotating said worm gear to thereby rotate said worm wheel to rotate said first conveyor section relative to said second conveyor section to thereby raise and lower said conveyor end section to position the end thereof at the delivery location to transfer animal feed from the bin to the delivery location.

2. The combination according to claim 1 wherein said ears of said worm gear cradle have bearing appertures therein, said apertures having a common axis perpendicular to the central axis of said worm wheel, and said worm gear being rotatably mounted in said bearing apertures.

3. The conveyor apparatus of claim 1 wherein said worm wheel retaining means includes an annular slot on said cylindrical worm wheel bearing surface and an annular snap ring in said slot to retain said worm wheel on said bearing surface.

4. The combination according to claim 1 wherein a animal feed conveying auger is located inside the second section and passes through said passage of the said cylindrical bearing surface, the passage confining the conveyed animal feed as it passes therethrough.

* * * * *